United States Patent [19]

Kawamura et al.

[11] 4,278,326
[45] Jul. 14, 1981

[54] LIQUID CRYSTAL DISPLAY ELEMENT

[75] Inventors: Hiromitsu Kawamura; Tokuyoshi Nakajima; Yoshimichi Shibuya, all of Mobara; Hisao Yokokura, Hitachi, all of Japan

[73] Assignee: Hitachi, Ltd., Tokyo, Japan

[21] Appl. No.: 973,814

[22] Filed: Dec. 28, 1978

[30] Foreign Application Priority Data

Mar. 15, 1978 [JP] Japan ................................ 53-28704

[51] Int. Cl.³ ............................................ G02F 1/133
[52] U.S. Cl. .................... 350/343; 350/341; 106/53; 106/54
[58] Field of Search ............. 106/53, 54; 350/334, 350/341, 343

[56] References Cited

U.S. PATENT DOCUMENTS

| | | | |
|---|---|---|---|
| 3,873,330 | 3/1975 | Sherk et al. | 106/53 |
| 3,994,567 | 11/1976 | Matsuo et al. | 350/341 |
| 3,995,941 | 12/1976 | Nagahara et al. | 350/343 |
| 4,135,789 | 1/1979 | Hall | 350/343 |

*Primary Examiner*—Edward S. Bauer
*Attorney, Agent, or Firm*—Craig and Antonelli

[57] ABSTRACT

In a twisted nematic type liquid crystal display element wherein two electrode substrates, in which an electrode having desired patterns and an orientation controlling film for facilitating the orientation of liquid crystal molecules along a given direction are disposed in this order on the inner surface of each transparent substrate such as glass, are placed in parallel with a certain distance, the periphery of the transparent substrates are sealed with a sealing medium, and a nematic liquid crystal is enclosed in the space thus produced, the one characterized by using as the orientation controlling film a film of polymer having imide rings and as the sealing medium a calcined glass having a low melting point obtained by adding 1 to 5 parts by weight of either $SiO_2$ or $Al_2O_3$ or both of $SiO_2$ and $Al_2O_3$ to 100 parts by weight of a composition comprising:

$B_2O_3$—7.5–14.5% by weight,
$PbO$—71.5–81.2% by weight,
$ZnO$—0–14.0% by weight,
$CuO$—0–3.0% by weight, and
$Bi_2O_3$—1.5–3.0% by weight can give a liquid crystal display element having high reliability and being excellent in heat resistance, moisture resistance, durability and the like.

8 Claims, 1 Drawing Figure

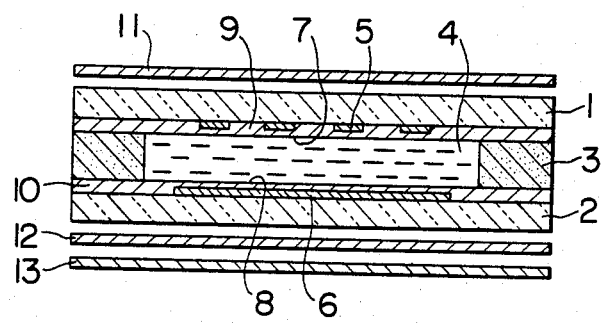

LIQUID CRYSTAL DISPLAY ELEMENT

This invention relates to a field-effect type liquid crystal display element. More particularly, this invention relates to a twisted nematic (TN) type liquid crystal display element which has high reliability and can easily be mass-produced, said display element using a specific liquid crystal molecular orientation controlling film and a low-melting glass with a specific composition as liquid crystal sealant.

The TN type liquid crystal display element is one of the field-effect type liquid crystal display elements, and its one example is shown in the accompanying drawing.

This liquid crystal display element comprises a first substrate (or electrode substrate) 1 and a second substrate (or electrode substrate) 2 both of which are made of transparent glass or other like material and arranged substantially parallel to each other with a predetermined space, for example 5 to 15 µm spacing therebetween, the peripheries of which are sealed by a sealant 3 such as frit glass, an organic adhesive, etc., and a nematic-phase liquid crystal 4 is encapsulated in the internal space formed by said substrates and the sealant.

On the opposing internal surfaces of said both first and second substrates 1 and 2 are formed electrodes 5 and 6 of predetermined patterns, while the surfaces contacting the liquid crystal are coated with liquid crystal orientation controlling films 9 and 10 having liquid crystal orientation controlling planes 7 and 8 which are capable of orientating the liquid crystal molecules in the neighborhood of each said plane in a given direction. Such orientation controlling planes 7 and 8 can be formed by first coating each substrate surface having the electrode with an orientation controlling film 9 or 10 made of an organic high polymeric material or an inorganic material and then rubbing its surface in a given direction with cotton, cloth or the like (this method being hereinafter referred to as the rubbing method) or depositing, for example, silicon oxide on the substrate surface from an oblique direction by means of vacuum evaporation (this method being hereinafter referred to as the oblique evaporation method).

In effecting liquid crystal orientation, a first given direction is selected for the liquid crystal orientation controlling plane 7 of the first substrate 1 while a second given direction is selected for the liquid crystal orientation controlling plane 8 of the second substrate 2, and these two directions are differentiated from each other so that the molecules of the nematic-phase liquid crystal 4 held between said both substrates 1 and 2 will be orientated twistedly from the first direction toward the second direction. The angle made by said first and second directions, that is, the twist angle of the liquid crystal molecules may be suitably selected, but generally it is approximately 90°.

Disposed outside of the substrates 1 and 2 are a first polarizing plate 11 and a second polarizing plate 12. These two polarizing plates 11 and 12 are usually so arranged that the angle made by the axes of polarization of said two polarizing plates will be equal to the twist angle of the liquid crystal molecules (that is, the angle made by said first and second directions) or will be zero (that is, both axes of polarization are parallel to each other), and that the axes of polarization of said two polarizing plates will be parallel or vertical to the orientation of the liquid crystal. In such a display element, usually a reflector 13 is disposed on the back side of the second polarizing plate 12.

Here, discussion is made on the operating principle of a reflection type liquid crystal display element designed such that the twist angle of the liquid crystal molecules is 90° and the angle made by the crossing axes of polarization of the two polarizing plates 11 and 12 is also 90°. If no electric field is present in the liquid crystal layer, an incoming light is polarized upon passage of the first polarizing plate 11 to become a rectilinear polarized light along the axis of polarization thereof and enters the liquid crystal layer 4. Since the liquid crystal molecules are twisted 90° in said layer, said polarized light undergoes a 90° optical rotation when passing the liquid crystal layer and then passes the second polarizing plate 12. This light is then reflected on the reflector 13 and the reflected light passes the second polarizing plate 12, the liquid crytal layer 4 and the first polarizing plate 11 in that order, or just contrariwise to the above-said light path, and finally emanates out of the liquid crystal display element. Thus, a viewer can see the polarized light which comes out of the liquid crystal display element after undergoing said polarization and reflection.

When a predetermined voltage is applied to the selected electrodes 5, 6 in such a display element to give an electric field to a specified area in the liquid crystal layer, the liquid crystal molecules in that area are orientated in the direction of the electric field. As a result, the polarizing plane loses the rotative power in said area and hence no optical rotation takes place in that area, so that the light polarized by the first polarizing plate 11 is intercepted by the second polarizing plate 12. Therefore, said area looks dark to the viewer. In the case of a liquid crystal display element where the axes of polarization of the two polarizing plates 11 and 12 are parallel to each other, the area in the liquid crystal layer where no electric field exists look dark while the area where an electric field was applied looks bright. It is therefore possible to make a desired display by applying a voltage to the certain selected electrodes.

Thus, in the liquid crystal display elements of the twisted structure, the molecules of the liquid crystal sealed between the two glass substrates must be orientated substantially parallel to the glass substrate surface, and also, in the liquid crystal layer, the molecules must be orientated with a twist of a predetermined angle, usually about 90°. Such liquid crystal orientation is accomplished by the orientation controlling films 9, 10 having the respective orientation controlling planes 7, 8 formed on the sides of the glass substrates opposed to the liquid crystal.

The afore-said oblique evaporation method and rubbing method are usually used for forming the orientation controlling plane capable of deriving a good initial orientation characteristic. It is generally believed that an inorganic coating can provide an excellent orientation controlling film in respects of heat resistance, chemical resistance and durability, but when it is tried to form such film by using the rubbing method which is simple in equipment and process, no good orientation controlling plane is obtained because the hardness of the inorganic film is too high. Therefore, when such a rubbing method is used with the electrode substrate material being glass, better results are obtained when the substrate surface is first coated with an organic film which is lower in hardness than the inorganic film and then the surface thereof is rubbed in a given direction. For this purpose, employment of an imide ring-containing polymer coating has been proposed, and it is considered that this coating is best in respects of heat resistance, chemical resistance and durability.

Among the important factors directly associated with the life of the liquid crystal display element are moisture resistance, chemical durability and airtightness of the sealed parts. Therefore, it is more desirable to use an inorganic sealant, which is excellent in moisture resistance, airtightness, etc., than using an organic one, and where high reliability is required, the sealing should be accomplished by using, for example, low-melting glass which is an inorganic material.

However, even said imide ring-containing polymer film, which is believed to be highest in heat resistance and reliability in all the known organic orientation controlling films, is also subject to certain limitation in heat resistance—usually 410° C. to 430° C. at highest, and if such a film is exposed to higher temperatures, uniformity of orientation is lost to give rise to various defects such as formation of an induction domain, resulting in deterioration of the performance as used in a display element.

Currently, soda-lime glass is popularly used for the electrode substrates in liquid crystal display elements. The coefficient of thermal expansion (hereinafter referred to as $\alpha$) of this soda-lime glass is $92 \times 10^{-7}/°C.$, so the sealant used for the display elements must be an inorganic low-melting glass whose $\alpha$ value well conforms to said value and which can flow sufficiently below 410° C. and can provide a seal. In production of a liquid crystal package it is of vital importance for certain important reasons such as quick response and long life to accurately control the minute space between the two electrode substrates, usually to 8 to 10 $\mu$m. In other words, the sealant for the glass substrates in a liquid crystal display element is required to be able not only to bond two glass plates but also to maintain good fluidity at 410° C. so as to strictly regulate the space between the two soda glass plates. No sealant of inorganic low-melting glass which meets the said conditions has been commercially available.

It is an object of the present invention to provide a liquid crystal display element which is easy to be mass-produced and high in reliability and in which the soda-lime glass made electrode substrates coated with an orientation controlling film formed from an imide ring-containing polymer coating having highest reliability among the known organic orientation controlling films are sealed with low-melting point glass which is a high-reliability inorganic sealant.

More particularly, this invention provides a liquid crystal display element comprising two electrode substrates each of which has formed on its inner side at least the electrodes having a predetermined configuration and a liquid crystal molecular orientation controlling film for orientating the liquid crystal molecules in a given direction, said two electrode substrates being opposed to each other with a predetermined spaced therebetween and sealed with a sealant, with a nematic liquid crystal being encapsulated between said two electrode substrates, characterized by using as the liquid crystal molecular orientation controlling film a film of polymer having imide rings, and as the sealant a calcined product of low-melting point glass obtained by adding 1 to 5 parts by weight of either $SiO_2$ or $Al_2O_3$ or both of $SiO_2$ and $Al_2O_3$ to 100 parts by weight of a composition comprising:

$B_2O_3$—7.5–14.0% by weight,
PbO—71.5–81.2% by weight,
ZnO—0–14.0% by weight,
CuO—0–3.0% by weight, and
$Bi_2O_3$—1.5–3.0% by weight.

Various glass compositions for sealing have been known (e.g. Japanese Pat. Appln. Kokai (Laid-Open) No. 140523/77 and Japanese Pat. Appln. Kokoku (Post-Exam) Nos. 22189/69 and 44567/77). But reasons for limiting each component in the above-mentioned composition used for sealing the soda-lime glass made electrode substrates in this invention are as follows.

If the content of $B_2O_3$ is less than 7.5% by weight, $\alpha$ becomes too large and the glass composition becomes apt to be devitrified, and if the $B_2O_3$ content is higher than 14.0% by weight, the viscosity of the composition becomes too high. If the PbO content is less than 71.5% by weight, the viscosity of the composition increases and the fusing temperature becomes higher than 400° C., while if the PbO content is greater than 81.2% by weight $\alpha$ becomes too large and the composition becomes apt to be devitrified. ZnO acts to relatively lower the viscosity of the composition without increasing $\alpha$, but when its content is higher than 14.0% by weight, the composition may be devitrified and an apparent viscosity increases. CuO has effects of bettering adhesion and reducing $\alpha$, but its content over 3.0% by weight makes the composition apt to be devitrified. A preferable range of CuO content is 0.5–2.0% by weight. $Bi_2O_3$ has a devitrification preventing effect, and hence, in producing the low-melting point glass according to this invention, the $Bi_2O_3$ loading must be controlled preponderantly. If the $Bi_2O_3$ loading is less than 1.5% by weight, it becomes impossible to prevent devitrification, while if it is greater than 3.0% by weight, the bonding temperature increases sharply and also $\alpha$ is enlarged. Thus, the very excellent characteristics suited to the objects of this invention can be obtained by strictly controlling the $Bi_2O_3$ content within the range of 1.5–3.0% by weight.

Both $SiO_2$ and $Al_2O_3$ are effective for preventing devitrification and improving chemical durability, and they demonstrate substantially the same properties when their loadings are within the range of several percents. Therefore, the compositional loading range of both $SiO_2$ and $Al_2O_3$ may be defined by their total amounts, or one of them may be omitted. The control of the $SiO_2$ and $Al_2O_3$ loading is important next to the control of the $Bi_2O_3$ loading in production of glass according to this invention. If the total amount of $SiO_2$ and $Al_2O_3$ is less than 1 part by weight per 100 parts by weight of the above-mentioned base composition, it becomes impossible to prevent devitrification and the viscosity of the composition increases. It was found that in case of re-fusing a fine-powdery composition (this system is employed for all of the currently used frit seals), fluidity of the composition is worsened at 400° C. However, addition of $SiO_2$ and $Al_2O_3$ in a total amount of more than 1 part by weight can greatly improve the fluidity of the composition, and since the composition is made into a paste, the fluidity is markedly bettered even in case of re-fusing a fine-powdery material. Chemical durability is sharply lowered in case the amount of $SiO_2$ and $Al_2O_3$ is less than 1 part by weight. On the other hand, if the total amount of $SiO_2$ and $Al_2O_3$ is greater than 5 parts by weight, there is induced a tendency to elevate the softening point of glass and to increase the viscosity of the composition.

The above-mentioned low-melting point glass sealant may be treated according to conventional method, for example, it is mixed with a binder (such as nitrocellulose, ethyl cellulose, etc.) and a solvent (such as n-butylcarbitol acetate, α-terpineol, etc.) to prepare a frit paste, then this paste is applied around the electrode substrates with a predetermined thickness by using a printing technique or other means, and then the two substrates are combined and bonded together with their orientation controlling sides opposed to each other and then calcined to thereby form a liquid crystal package.

The limited use of an imide ring-containing polymer coating for the orientation controlling film formed on the soda-lime glass made electrode substrates sealed by said low-melting point glass is based on the following reasons: any of the other organic coatings than the above-mentioned one are poor in heat resistance and orientating characteristic, and even when using the low-melting point glass which is used in this invention particularly to lower the sealing temperature, no desired uniformity of molecular orientation is obtained in the completed liquid crystal display element with the use of an orientation controlling film formed from an organic coating other than the above-mentioned one.

Examples of the imide ring-containing polymers usable in this invention are polyimide-isoindoloquinazolinedione copolymers, polyisoindoloquinazolinedione and other polyimides having the following structural units:

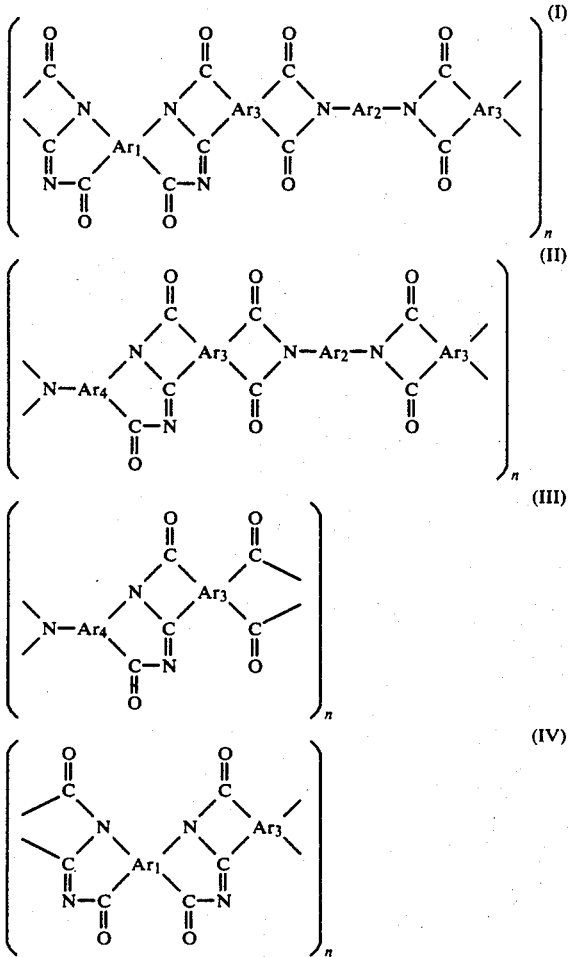

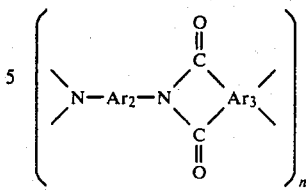

wherein $Ar_1$ is a diaminodiamide compound residue, $Ar_2$ is a diamine compound residue, $Ar_3$ is a tetracarboxylic acid dianhydride compound residue, $Ar_4$ is a diaminomonoamide compound residue and n is an integer of 80–120. In these polymers, 1,4-diaminobenzene-2,5-carbonamide, 4,4'-diaminodiphenylether-3,3'-carbonamide or the like can be used as diaminodiamide compounds; 1,4-diaminobenzene-2-carbonamide, 4,4'-diaminodiphenylether-3-carbonamide or the like can be used as diaminomonoamide compounds; p-phenylenediamine, 4,4'-diaminodiphenylether, 4,4''-diaminoterphenyl or the like can be used as diamine compounds; and pyromellitic acid dianhydride, 3,3',4,4'-benzophenonetetracarboxylic acid dianhydride or the like can be used as tetracarboxylic acid dianhydride compounds. N-Methyl-2-pyrrolidone, N,N-dimethylacetamide and the like may be used as the organic solvent in this invention. In practicing the present invention, an even better display element can be obtained when using the substrates provided with an insulating coating below or above the electrode layer. This is based on the experimental results that the polymer resin coating on the film of $SiO_2$ or the like suffers less weight loss on heating than the polymer resin coating on the glass substrate. A $SiO_2$ or mixed $SiO_2$–$Al_2O_3$ film may be used as the insulating film which provides said effect. In forming the orientation controlling film used in this invention, there is no need of giving any specific consideration to the treatment of the polymer solution, and any commonly used techniques such as brushing, immersion, rotational coating, printing, etc., can be employed for forming such a film, and after hardening, the film is rubbed with a cloth, gauze or such.

It is possible to add one or more epoxy type or amino type silane coupling agents for obtaining the orientation controlling film with even greater adhesion. Examples of such silane coupling agents are γ-aminopropyltriethoxysilane, γ-glycidoxypropyltrimethoxysilane, etc.

The invention is now described in further detail by the following examples.

EXAMPLE 1

On each previously cleaned glass plate was formed a $SiO_2$ film with a thickness of 1,200 Å, and also formed transparent electrodes principally composed of $In_2O_3$ in a predetermined configuration to produce each electrode substrate. Then each orientation controlling film of a polyimide-isoindoloquinazoline copolymer resin obtained by reacting para-phenylenediamine (90% by mole), 4,4'-diaminodiphenylether-3,3'-carbonamide (10% by mole), pyromellitic acid dianhydride (50% by mole) was formed, with a thickness of 800 Å by normal printing techniques, on each electrode substrate and then the surface of said orientation controlling film was rubbed to obtain an orientation controlling plane.

On the other hand, a low-melting point glass frit prepared by adding 1.5 parts by weight of $SiO_2$ and 2.0 parts by weight of $Al_2O_3$ to 100 parts by weight of a base composition of 10.0% by weight of $B_2O_3$, 81.1% by weight of PbO, 4.0% by weight of ZnO, 2.3% by weight of CuO and 2.6% by weight of $Bi_2O_3$ was mixed with nitrocellulose (a binder) and n-butylcarbitol acetate (a solvent) to prepare a frit paste. The resulting paste was applied around said electrode substrates with predetermined thickness by using the printing techniques, and then the two substrates were combined together placing their respective orientation controlling planes opposed to each other and calcined at 400° C. for 30 minutes to form a liquid crystal package.

Thereafter, a liquid crystal (Ester LC) was poured into the package from a suitably formed pouring hole and then this pouring hole was sealed with a low-melting point alloy to thereby form a liquid crystal display element. A 20 V DC voltage was applied to this liquid crystal display element from the outside thereof through a transparent conductive film, but there took place no damaging changes which usually tend to occur, such as reduced orientating performance, coloring of the electrode film, generation of air bubbles, etc., nor was formed any induction domain. The element could also withstand power application for more than 1,000 hours. Further, no change was seen in uniformity of orientation, contrast and liquid crystal temperature range even when the element was left under the high-temperature and high-humidity conditions (70° C., 95%) for 1,000 hours. As is clear from these results, a liquid crystal display element with high reliability could be produced according to this invention.

EXAMPLE 2

The electrode substrates were prepared in the same way as described in Example 1, and then an orientation controlling film of a polyimideisoindoloquinazolinedione copolymer resin obtained by reacting 4,4'-diaminodiphenylether-3-carbonamide (20% by mole), 4,4''-diaminoterphenyl (80% by mole) and pyromellitic acid dianhydride (100% by mole) was formed on each of said electrode substrates with a thickness of 800 Å, and the surface of the film was rubbed in a predetermined direction to form an orientation controlling plane. This was followed by the frit sealing and the liquid crystal (Azoxy plus Ester LC) encapsulation in the same manner as described in Example 1. The results of the tests conducted in the same manner as described in Example 1 assured that the product is an excellent display element.

EXAMPLE 3

The electrode substrates were prepared in the same way as described in Example 1, and then a film of a polyimide-isoindoloquinazolinedione copolymer resin obtained by reacting 1,4-diaminobenzene-2-carbonamide (100% by mole), pyromellitic acid dianhydride (30% by mole) and 3,3',4,4'-benzophenonetetracarboxylic acid dianhydride (70% by mole) was formed on each said substrate with a thickness of 500 Å, and the surface thereof was rubbed in a predetermined direction to form an orientation controlling plane. Then, the frit sealing was performed by using a low-melting point glass frit prepared by adding 1.5 parts by weight of $SiO_2$ and 2.0 parts by weight of $Al_2O_3$ to 100 parts by weight of a base composition comprising 11.6% by weight of $B_2O_3$, 80.9% by weight of PbO, 2.4% by weight of ZnO, 2.4% by weight of CuO and 2.8% by weight of $Bi_2O_3$, followed by the liquid crystal encapsulation, both in the same way as described in Example 1. Excellent quality of the obtained display element was ascertained as the results of the tests conducted in the same manner as described in Example 1.

EXAMPLE 4

A film of a polyisoindoloquinazolinedione resin obtained by reacting 1,4-diaminobenzene-2,5-carbonamide (100% by mole) and 3,3',4,4'-benzophenonetetracarboxylic acid dianhydride (100% by mole) was formed on each electrode substrate with a thickness of 1,000 Å, and the surface thereof was rubbed in a given direction to make an orientation controlling plane. This was followed by the same treatments as carried out in Example 1. The results of the tests conducted in the same manner as described in Example 1 ascertained excellency of the obtained display element.

EXAMPLE 5

A film of a polyimide resin obtained by reacting p-phenylenediamine (50% by mole) and 4,4''-diaminoterphenyl (50% by mole) with 3,3',4,4'-benzophenonetetracarboxylic acid dianhydride (100% by mole) was formed on each electrode substrate with a thickness of 800 Å, and its surface was rubbed in a given direction to form an orientation controlling plane. This was followed by the same treatments as in Example 1 and the excellent results were ascertained by the tests conducted in the same way as described in Example 1.

EXAMPLE 6

To the same copolymer solution as used in Example 5 was further added 0.1% by weight of $\gamma$-glycidoxypropyltrimethoxysilane to form an orientation controlling film and its surface was rubbed in a given direction to obtain an orientation controlling plane. This was followed by the same treatments as conducted in Example 1. The tests conducted in the same manner as described in Example 1 showed the excellent results.

As described above, it is possible according to this invention to obtain a liquid crystal display element with high reliability by using an orientation controlling film formed by the rubbing method which is relatively simple in process and easy to perform.

What is claimed is:

1. In a liquid crystal display element comprising two electrode substrates, each of which is a transparent substrate, an electrode having the desired patterns formed on the inner surface of at least one of said transparent substrates, and a liquid crystal molecule orientation controlling film formed on the inner surface of said electrode, said two electrode substrates being placed in parallel with a certain distance therebetween and sealed therearound by a sealant, and a nematic liquid crystal being enclosed in the space thus produced, the improvement which comprises using as the liquid crystal molecule orientation controlling film a film of a polymer having imide rings and as the sealant a calcined product of low-melting point glass obtained by adding 1 to 5 parts by weight of either $SiO_2$ or $Al_2O_3$ or both of $SiO_2$ and $Al_2O_3$ to 100 parts by weight of a base composition comprising:

$B_2O_3$—7.5–14.5% by weight,
PbO —71.5–81.2% by weight,
ZnO —0–14.0% by weight,
CuO —0–3.0% by weight, and
$Bi_2O_3$—1.5–3.0% by weight.

2. A liquid crystal display element according to claim 1, wherein the sealant is a calcined product of glass obtained by adding 1.5 parts of weight of $SiO_2$ and 2.0 parts by weight of $Al_2O_3$ to 100 parts by weight of a base composition comprising:

$B_2O_3$—10.0–11.6% by weight,
PbO —80.9–81.1% by weight,
ZnO —2.4–4.0% by weight,
CuO —2.3–2.4% by weight, and
$Bi_2O_3$—2.6–2.8% by weight.

3. A liquid crystal display element according to claim 1, wherein the polymer having imide rings is polyimide, polyimide-isoindoloquinazolinedione or polyisoindoloquinazolinedione, having the following structural units:

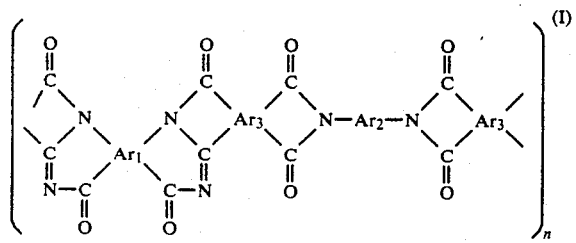

(I)

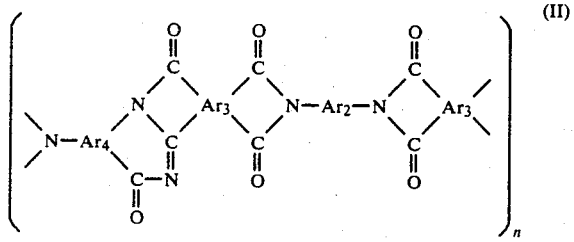

(II)

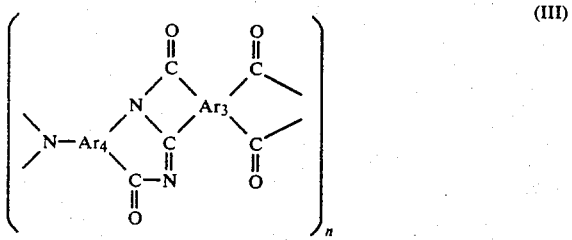

(III)

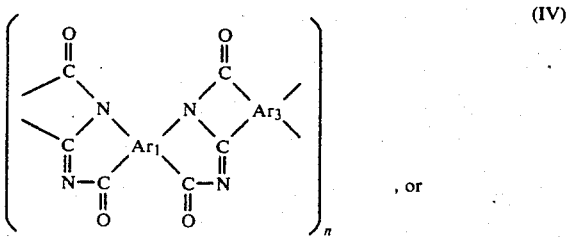

(IV)

, or

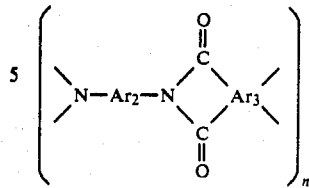

(V)

wherein $Ar_1$ is a diaminodiamide compound residue, $Ar_2$ is a diamine compound residue, $Ar_3$ is a tetracarboxylic acid dianhydride compound residue, $Ar_4$ is a diaminomonoamide compound residue, and n is an integer of 80 to 120.

4. A liquid crystal display element according to claim 3, wherein the polymer has the structural unit of the formula (I) in which the diaminodiamide compound is 1,4-diaminobenzene-2,5-carbonamide or 4,4'-diaminodiphenylether-3,3'-carbonamide, the diamine compound is p-phenylenediamine, 4,4'-diaminodiphenylether, or 4,4''-diaminoterphenyl, and the tetracarboxylic acid dianhydride compound is pyromellitic acid dianhydride, or 3,3',4,4'-benzophenonetetracarboxylic acid dianhydride.

5. A liquid crystal display element according to claim 3, wherein the polymer has the structural unit of the formula (II) in which the diamine compound is p-phenylenediamine, 4,4'-diaminodiphenylether, or 4,4''-diaminoterphenyl, the tetracarboxylic acid dianhydride compound is pyromellitic acid dianhydride or 3,3',4,4'-benzophenonetetracarboxylic acid dianhydride, and the diaminomonoamide compound is 1,4-diaminobenzene-2-carbonamide or 4,4'-diaminodiphenylether-3-carbonamide.

6. A liquid crystal display element according to claim 3, wherein the polymer has the structural unit of the formula (III) in which the tetracarboxylic acid dianhydride compound is pyromellitic acid dianhydride or 3,3',4,4'-benzophenonetetracarboxylic acid dianhydride, and the diaminomonoamide compound is 1,4-diaminobenzene-2-carbonamide or 4,4'-diaminodiphenylether-3-carbonamide.

7. A liquid crystal display element according to claim 3, wherein the polymer has the structural unit of the formula (IV) in which the diaminodiamide compound is 1,4-diaminobenzene-2,5-carbonamide or 4,4'-diaminodiphenylether-3,3'-carbonamide, and the tetracarboxylic acid dianhydride compound is pyromellitic acid dianhydride or 3,3',4,4'-benzophenonetetracarboxylic acid dianhydride.

8. A liquid crystal display element according to claim 3, wherein the polymer has the structural unit of the formula (V) in which the diamine compound is p-phenylenediamine, 4,4'-diaminodiphenylether or 4,4''-diaminoterphenyl and the tetracarboxylic acid dianhydride compound is pyromellitic acid dianhydride or 3,3',4,4'-benzophenonetetracarboxylic acid dianhydride.

* * * * *